US012662980B2

(12) United States Patent
Gangler et al.

(10) Patent No.: US 12,662,980 B2
(45) Date of Patent: Jun. 23, 2026

(54) FUEL PRESSURE REGULARTOR WITH JET PUMP

(71) Applicant: Walbro LLC, Cass City, MI (US)

(72) Inventors: Bryan K. Gangler, Unionville, MI (US); Jacob R. Mikulak, Vassar, MI (US); Bradley J. Roche, Millington, MI (US); Spencer J. Schaefer, Bay City, MI (US); David L. Speirs, Cass City, MI (US); Edward J. Talaski, Caro, MI (US)

(73) Assignee: WALBRO LLC

( * ) Notice: Subject to any disclaimer, the term of this patent is extended or adjusted under 35 U.S.C. 154(b) by 0 days.

(21) Appl. No.: 18/025,469

(22) PCT Filed: Sep. 22, 2021

(86) PCT No.: PCT/US2021/051449
§ 371 (c)(1),
(2) Date: Mar. 9, 2023

(87) PCT Pub. No.: WO2022/066701
PCT Pub. Date: Mar. 31, 2022

(65) Prior Publication Data
US 2023/0332566 A1     Oct. 19, 2023

Related U.S. Application Data

(60) Provisional application No. 63/082,495, filed on Sep. 24, 2020.

(51) Int. Cl.
| *F02M 37/02* | (2006.01) |
| *B01D 35/26* | (2006.01) |
(Continued)

(52) U.S. Cl.
CPC ........... *F02M 37/025* (2013.01); *B01D 35/26* (2013.01); *F02M 37/44* (2019.01); *F02M 37/48* (2019.01); *F04F 5/44* (2013.01)

(58) Field of Classification Search
CPC ...... F02M 37/025; F02M 37/44; F02M 37/48; F02M 37/0029; F02M 37/0076; B01D 35/26; F04F 5/44
See application file for complete search history.

(56) References Cited

U.S. PATENT DOCUMENTS

| 6,502,558 B1 | 1/2003 | Brunel | |
| 7,182,071 B2 * | 2/2007 | Hansson | ................ B60K 15/03 123/514 |

(Continued)

FOREIGN PATENT DOCUMENTS

| GB | 2378223 B | 12/2004 |
| JP | 2001280297 A | * 10/2001 |

(Continued)

OTHER PUBLICATIONS

Written Opinion & International Search Report for PCT/US2021/051449 dated Dec. 27, 2021, 13 pages.

(Continued)

*Primary Examiner* — Long T Tran
*Assistant Examiner* — Charles J Brauch
(74) *Attorney, Agent, or Firm* — DAY PITNEY LLP; George N. Chaclas; Christopher J. Head

(57) ABSTRACT

In at least some implementations, a jet pump includes a main body having a first inlet, an inlet passage communicated with the inlet, a second inlet, an intake passage communicated with the second inlet, an outlet, and an outlet passage communicated with the outlet and with the intake passage, a jet carried by the main body and having a jet inlet communicated with the inlet passage so that fluid flowing in (Continued)

the inlet passage flows through the jet inlet, and a jet outlet having a flow area less than the jet inlet and less than the inlet passage. The main body is formed in one piece and the jet is a separate piece of material that is inserted into the inlet passage after the main body has been formed.

17 Claims, 5 Drawing Sheets

(51) Int. Cl.
    *F02M 37/44*     (2019.01)
    *F02M 37/48*     (2019.01)
    *F04F 5/44*      (2006.01)

(56)            References Cited

U.S. PATENT DOCUMENTS

| | | |
|---|---|---|
| 7,278,401 B1 | 10/2007 | Cotton et al. |
| 10,690,096 B2 | 6/2020 | Hayashi |
| 11,008,987 B2 | 5/2021 | Cotton et al. |
| 2016/0025050 A1 | 1/2016 | Salsburey |
| 2019/0331140 A1 | 10/2019 | Pauer et al. |
| 2020/0355148 A1 | 11/2020 | Billot et al. |

FOREIGN PATENT DOCUMENTS

| | | |
|---|---|---|
| JP | 2002364481 A | 12/2002 |
| JP | 2018031343 A | 3/2018 |
| WO | WO2020106430 A1 | 5/2020 |

OTHER PUBLICATIONS

International Preliminary Report on Patentability for PCT/US2021/051449 dated Apr. 6, 2023, 9 pages.

* cited by examiner

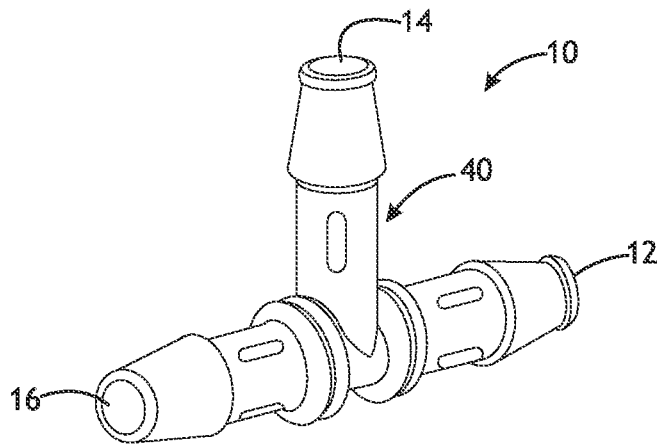
_Fig.1_
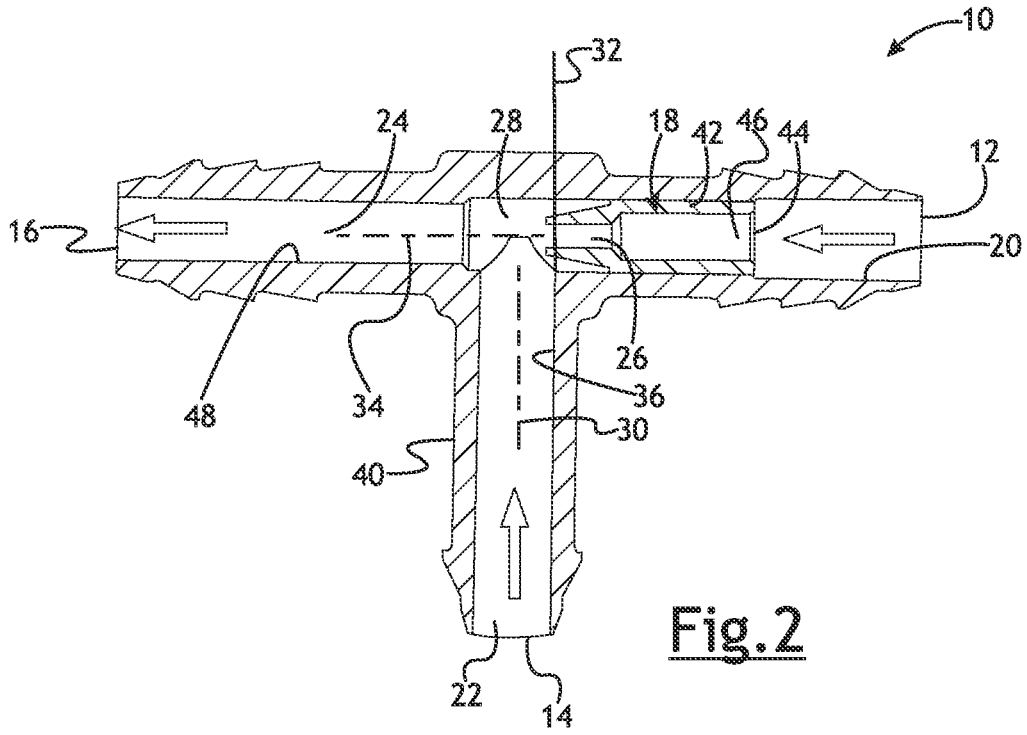
_Fig.2_

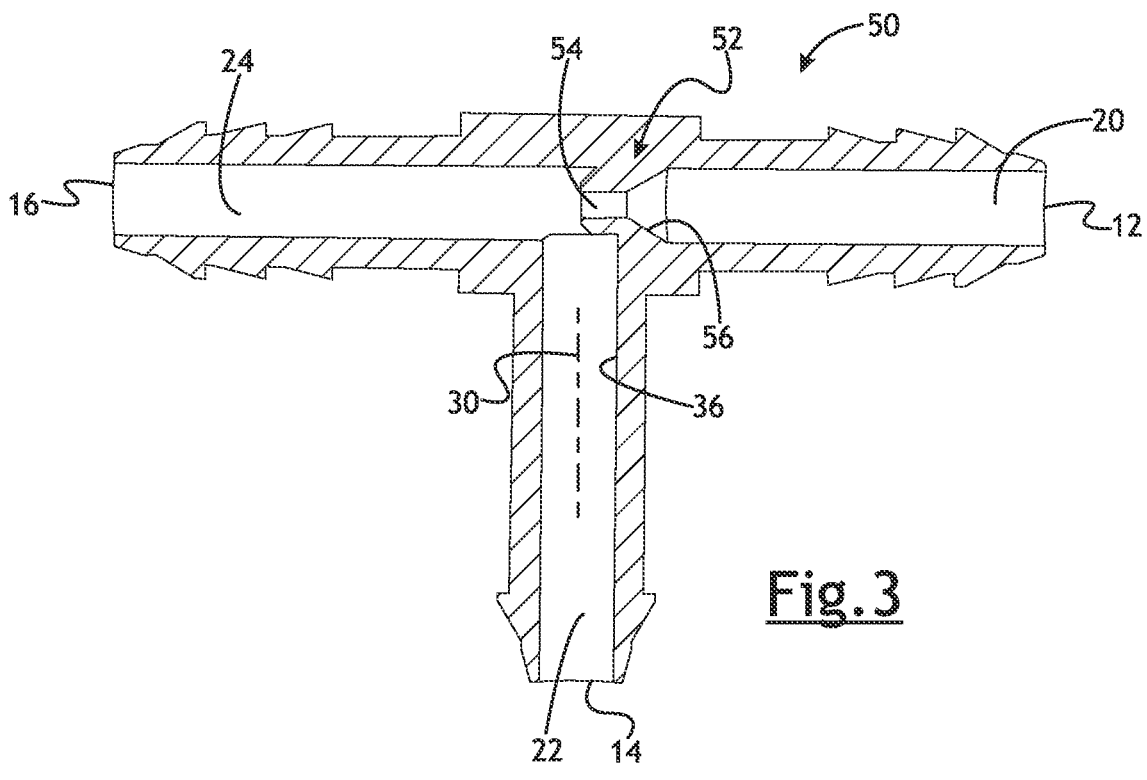
_Fig.3_
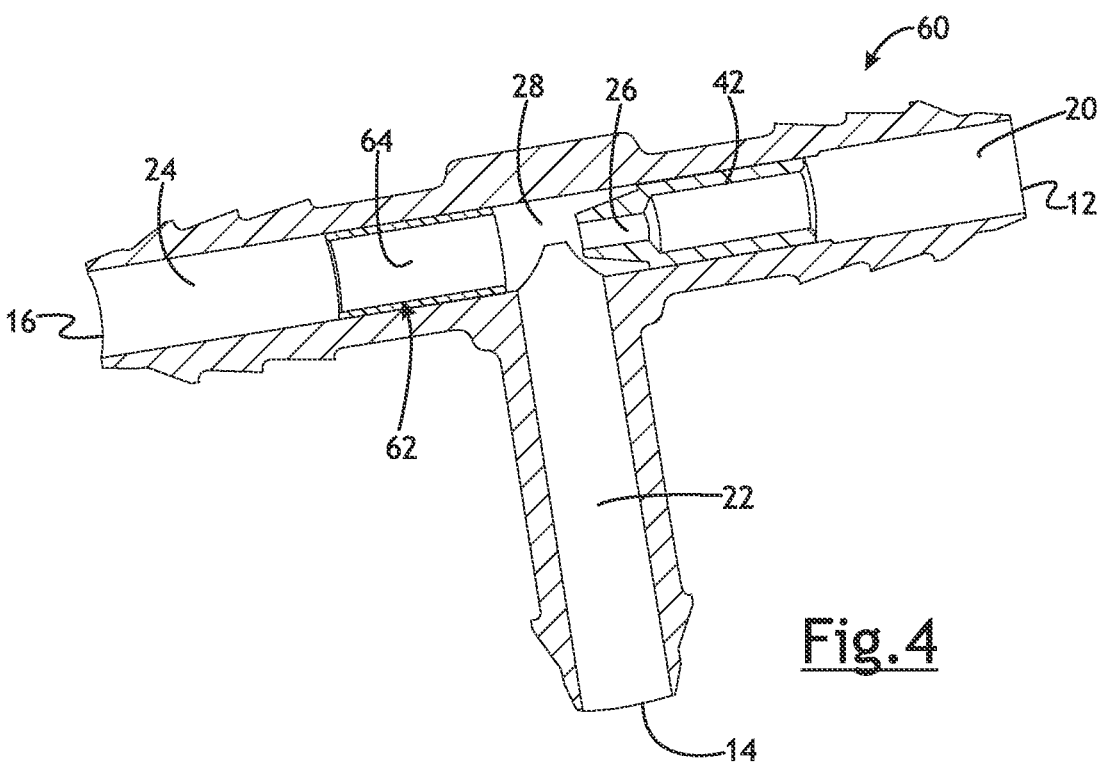
_Fig.4_

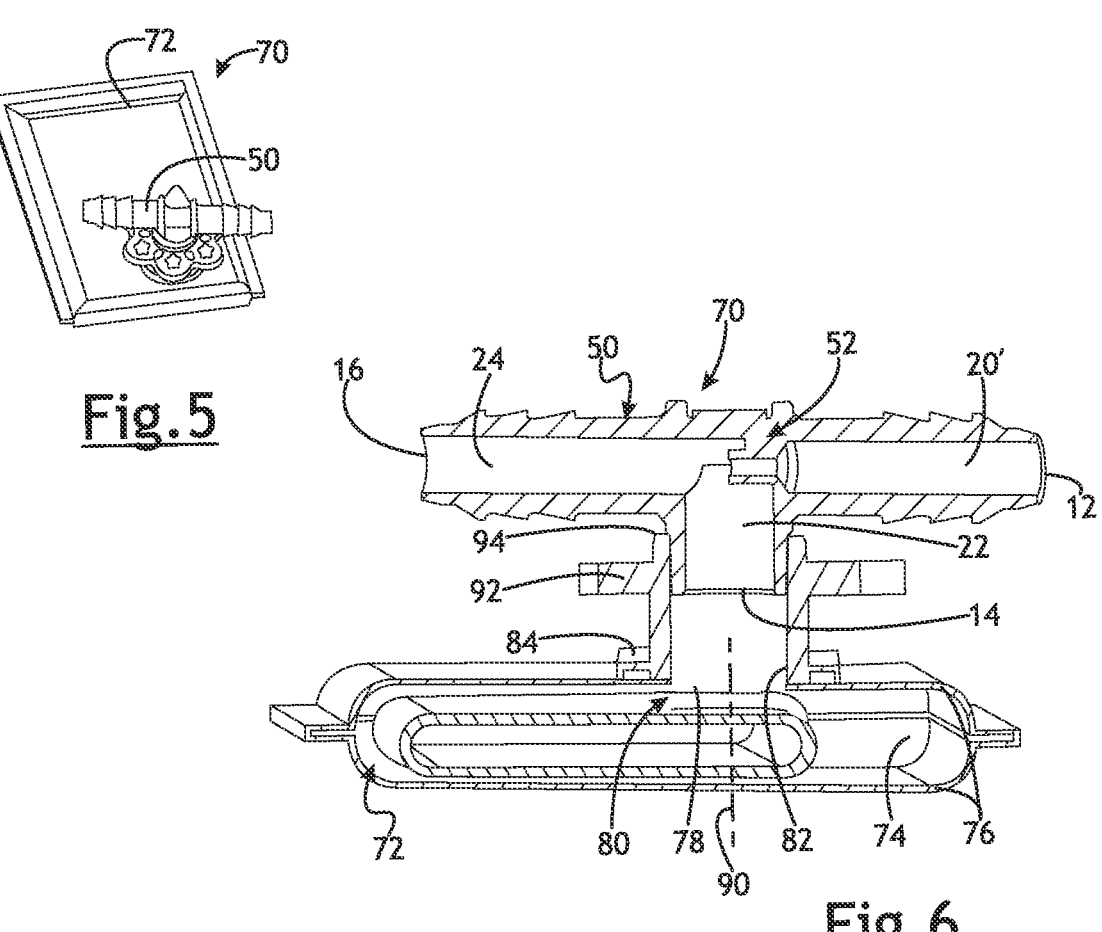
Fig.5
Fig.6
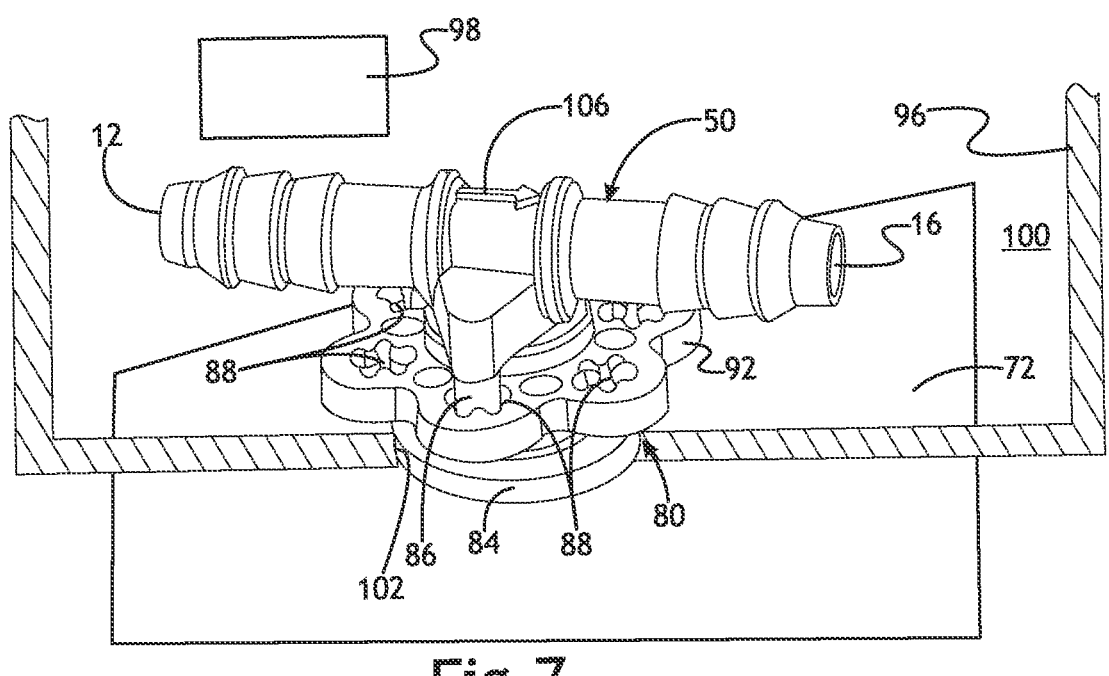
Fig.7

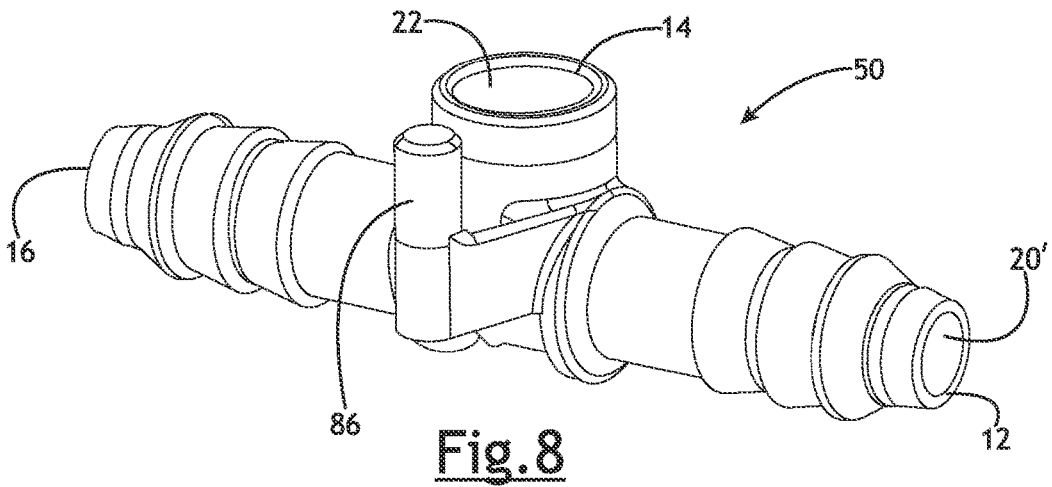
_Fig.8_
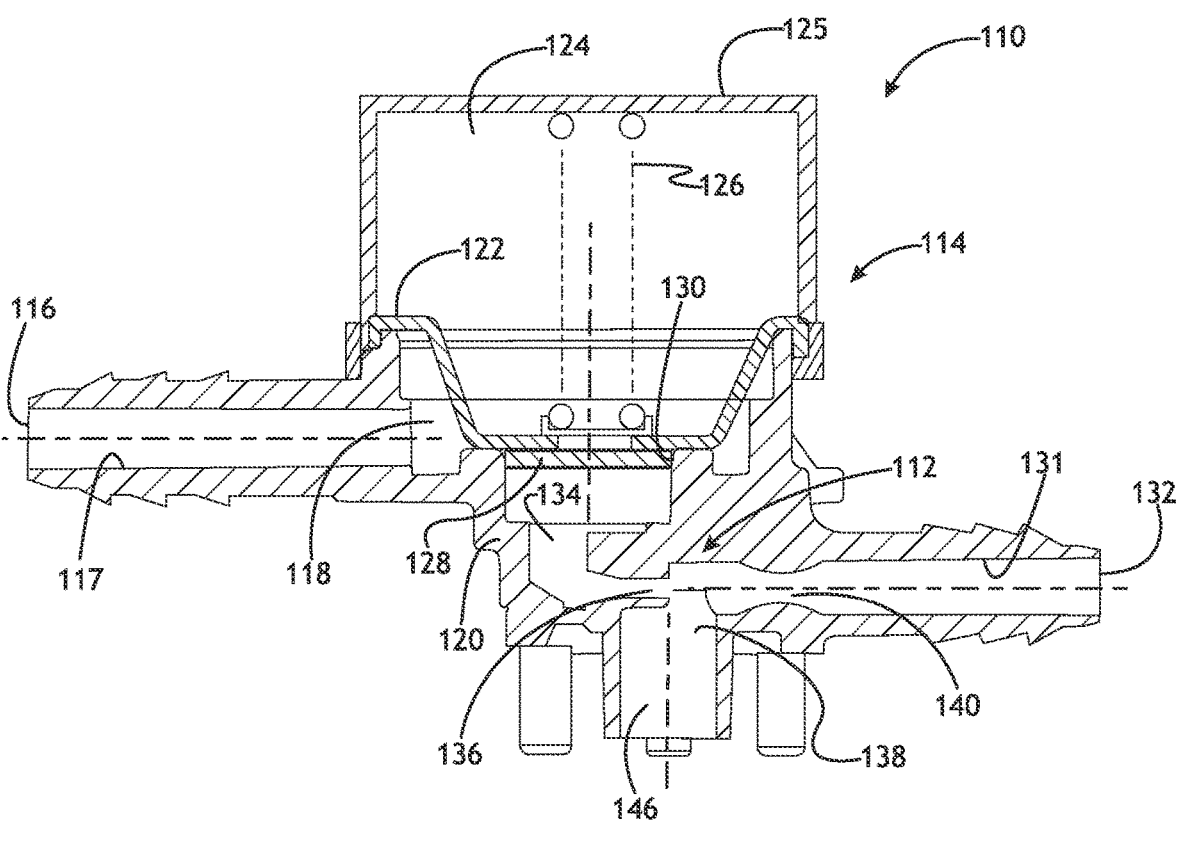
_Fig.9_

FUEL PRESSURE REGULARTOR WITH JET PUMP

REFERENCE TO RELATED APPLICATIONS

This application claims the benefit of U.S. Provisional Application Ser. No. 63/082,495 filed on Sep. 24, 2020 the entire content of which is incorporated herein by reference in its entirety.

TECHNICAL FIELD

The present disclosure relates generally to a jet pump and to a filter assembly including a jet pump.

BACKGROUND

Some vehicles include fuel tanks having odd shapes, or portions spaced a significant distance from a main fuel pump. Fuel pickups may be used to help move fuel from one portion of the tank remote from a primary fuel pump to a portion of the tank including or nearer to the primary fuel pump. The fuel pickups may include a fluid driven pump. The fluid driven pumps, and the fuel system in general may include a large number of components, like the fuel pickups, fluid driven pumps, filters, fuel pressure regulators, and the like, and production and assembly of the various different components can be difficult, costly and time consuming.

SUMMARY

In at least some implementations, a jet pump includes a main body having a first inlet, an inlet passage communicated with the inlet, a second inlet, an intake passage communicated with the second inlet, an outlet, and an outlet passage communicated with the outlet and with the intake passage, a jet carried by the main body and having a jet inlet communicated with the inlet passage so that fluid flowing in the inlet passage flows through the jet inlet, and a jet outlet having a flow area less than the jet inlet and less than the inlet passage. The main body is formed in one piece and the jet is a separate piece of material that is inserted into the inlet passage after the main body has been formed.

In at least some implementations, the main body includes a jet outlet area downstream of the jet outlet and having a flow area greater than the jet outlet, and the intake passage and outlet passage communicate with the jet outlet area.

In at least some implementations, the outlet passage increases in flow area from an upstream end to a downstream end.

In at least some implementations, the main body is formed from a non-metal material and the jet is formed from a metal.

In at least some implementations, an outlet body is received in the outlet passage and has a flow passage that is aligned with the outlet passage and through which fluid flows prior to exiting the outlet, the flow passage has a diameter or flow area that is smaller than the outlet, and smaller than the portion of the outlet passage in which the outlet body is received.

In at least some implementations, a jet pump, includes a body having a first inlet, an inlet passage communicated with the inlet, a second inlet, an intake passage communicated with the second inlet, an outlet, an outlet passage communicated with the outlet and with the intake passage, and a jet integrally formed in the body and communicated with the inlet passage so that fluid flowing in the inlet passage flows through the jet. The jet has a jet outlet that has a flow area less than the inlet passage, wherein the first inlet, inlet passage, second inlet, intake passage, outlet, outlet passage and the jet are formed in one piece of material.

In at least some implementations, the body includes a reducing section in the inlet passage that has a larger flow area adjacent to the inlet than the jet outlet.

In at least some implementations, the main body includes a jet outlet area downstream of the jet outlet and having a flow area greater than the jet outlet, and wherein the intake passage and outlet passage communicate with the jet outlet area.

In at least some implementations, a filter assembly, includes a filter having an interior bounded at least in part by filter material, a jet pump having a first inlet, an inlet passage communicated with the inlet, a second inlet, an intake passage communicated with the second inlet and with the interior of the filter, an outlet, an outlet passage communicated with the outlet and with the intake passage, and a jet communicated with the inlet passage so that fluid flowing in the inlet passage flows through the jet, and the jet having a jet outlet that has a flow area less than the inlet passage, wherein the first inlet, inlet passage, second inlet, intake passage, outlet, and outlet passage are formed in one piece of material. The jet is either formed in the same piece of material as the inlet passage or the jet is a separate component that is located in the inlet passage.

In at least some implementations, a coupler is provided that defines at least part of an outlet of the filter, and the coupler includes a tubular body and the jet pump is connected to the coupler and the intake passage is communicated with tubular body. In at least some implementations, the portion of the jet pump that defines the intake passage is received in or over the tubular body. In at least some implementations, the coupler and jet pump include multiple orientation features so that the jet pump can be retained in different angular orientations relative to the coupler. In at least some implementations, the orientation features include one or more projections carried by one of the coupler and jet pump, and one or more voids carried by the other of the coupler and jet pump.

In at least some implementations, a fuel pressure regulator, includes a housing, a diaphragm and a secondary fuel pump. The housing has a first body with a valve seat, a second body coupled to the first body, an inlet, a pressure regulating chamber in communication with the inlet, and the housing has an outlet. The diaphragm is carried by the housing and defines part of the pressure regulating chamber, the diaphragm having a first position closing the valve seat and a second position in which fuel flows through the valve seat. The secondary fuel pump is carried by the housing, the secondary fuel pump has a nozzle and an intake passage communicated with an area downstream of the nozzle and with the outlet, wherein the nozzle is aligned with the outlet and fuel that flows through the valve seat then flows through the nozzle prior to exiting the housing through the outlet, and wherein fuel flow through the nozzle creates a drop in pressure to draw fuel into the housing through the intake passage.

In at least some implementations, the nozzle is formed in the same piece of material as the first body.

In at least some implementations, the intake passage is formed in the same piece of material as the first body.

In at least some implementations, the nozzle, valve seat, inlet and outlet are provided in the first body.

In at least some implementations, a regulating valve is provided that has an inlet communicated with the valve seat and with the nozzle, the regulating valve includes a valve element that opens when the pressure of fuel downstream of the valve seat and upstream of the nozzle is greater than a threshold pressure.

In at least some implementations, the inlet and the outlet are defined in passages that extend from the same side of the first body.

BRIEF DESCRIPTION OF THE DRAWINGS

The following detailed description of certain embodiments and best mode will be set forth with reference to the accompanying drawings, in which:

FIG. 1 is a perspective view of a molded jet pump body;

FIG. 2 is a sectional view of an embodiment of a molded jet pump body;

FIG. 3 is a sectional view of an embodiment of a molded jet pump body;

FIG. 4 is a sectional view of an embodiment of a molded jet pump body;

FIG. 5 is a perspective view of a filter assembly including a molded jet pump body coupled to a filter;

FIG. 6 is a sectional view of the filter assembly of FIG. 5;

FIG. 7 is an enlarged perspective view of a portion of the filter assembly showing a mount for the jet pump body;

FIG. 8 is a perspective view of a molded jet pump body;

FIG. 9 is a sectional view of a body defining part of a pressure regulator housing and including a jet pump;

DETAILED DESCRIPTION

Figures 10, 11:
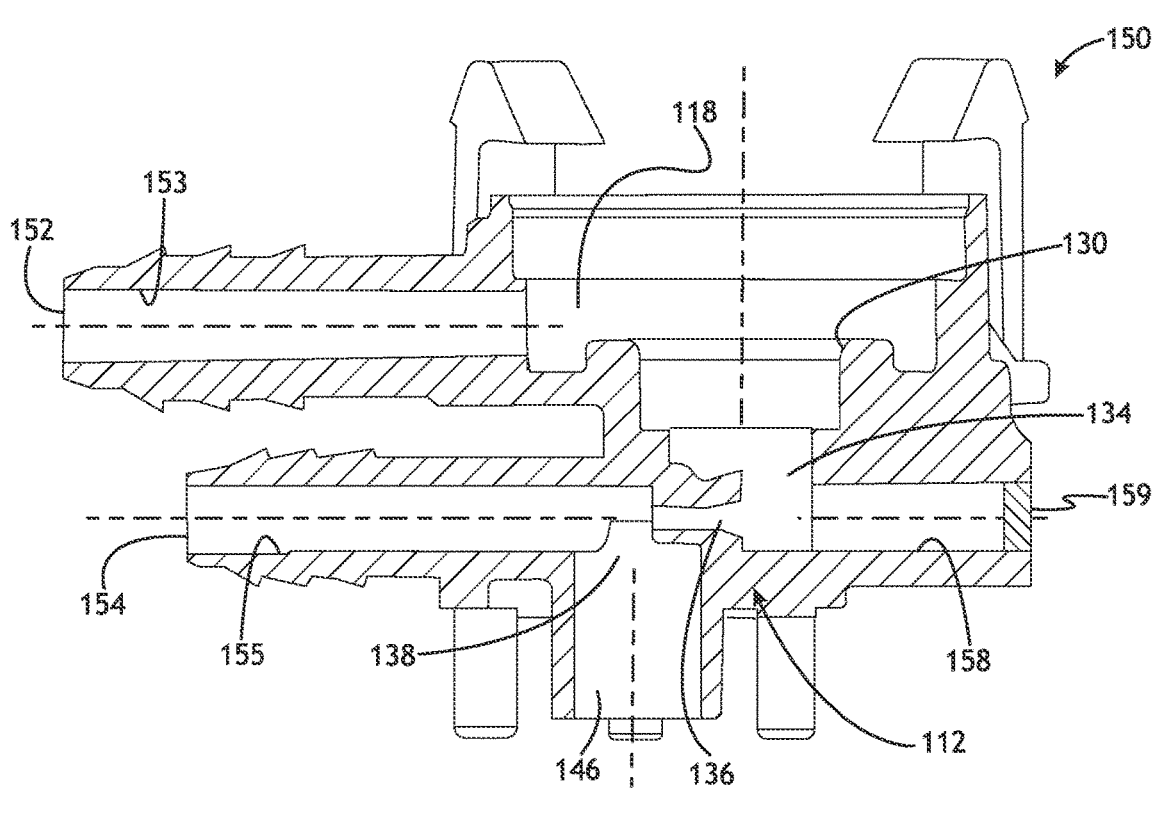
FIG. 10 is a sectional view of a body defining part of a pressure regulator housing and including a jet pump.
FIG. 11 is a is a sectional view of a body defining part of a pressure regulator housing and a jet pump, and including a secondary pressure regulator.

Referring in more detail to the drawings, FIGS. 1 and 2 illustrate a jet pump body 10 that is formed from a molded material, such as a plastic that is suitable for use in liquid fuel or other fluids in which the jet pump body 10 may be used. The jet pump body 10 includes openings that define a first inlet 12, a second inlet 14 and an outlet 16. The first inlet 12 is communicated with a nozzle or jet 18 via an inlet passage 20, the jet 18 is communicated with the second inlet 14 via an intake passage 22, and the outlet 16 is communicated with both the jet 18 and the intake passage 22 via an outlet passage 24. The outlet 16 and second inlet 14 are communicated with the first inlet 12 via the outlet passage 24, intake passage 22 and through the jet 18.

The jet 18 has an outlet 26 oriented to direct fluid into the outlet passage 24, and a jet outlet area 28 that is downstream of the jet 18 and larger than jet outlet 26 (i.e. has a larger flow area). In at least some implementations, the jet outlet 26 may be received between an axis 30 of the intake passage 22 and a line 32 that is parallel to the intake passage axis 30, intersects an axis 34 of the jet outlet 26, and which is tangent to or intersects an inner surface 36 of the jet pump body 10 that defines the intake passage 22. That is, the jet outlet 26 may be received axially outboard of the inner surface 36 that defines the intake passage 22 and radially between the intake passage axis 30 and the inner surface 36. Stated differently, if the inner surface 36 were extended toward the jet 18, it would intersect the jet 18 at or inboard of the jet outlet 26.

In use, a driving fluid is provided to the first inlet and flows through the inlet passage to the jet. The driving fluid then flows through the jet outlet 26 and into the jet outlet area 28 whereupon the velocity of the driving fluid is increased and the pressure of the driving fluid is decreased.

The second inlet 14 is communicated with fluid to be pumped, and the second inlet 14 is communicated with the jet outlet area 28 via the intake passage 22. The pressure decrease caused by driving fluid flowing through the jet 18 is communicated with the second inlet 14 and fluid to be pumped is drawn through the second inlet 14 and intake passage 22. This pumped fluid drawn through the second inlet 14 is routed from the intake passage 22 to the jet outlet area 28 wherein the pumped fluid is combined with the driving fluid flowing through the jet outlet area 28, and the combined flow of driving fluid and pumped fluid flows to and through the outlet passage 24 and out of the outlet 16.

As shown in FIG. 2, the jet body 10 may include a main body 40 formed in the same piece of material (e.g. molded in one-piece) and including the first inlet 12, inlet passage 20, second inlet 14, intake passage 22, jet outlet area 28, the outlet 16 and outlet passage 24. The jet 18 may be formed in a separate piece of material that is inserted into the inlet passage 20. The jet 18 may include a body 42 having a jet inlet 44, a jet passage 46 and the jet outlet 26. The jet body 42 can be formed from the same type of material as the main body 40, or a different material, such as a metal like brass or stainless steel, as desired. The jet inlet 44 is oriented closer to the first inlet 12 than is the jet outlet 26, and the jet outlet 26 may open directly into the jet outlet area 28 of the main body 40. The jet body 42 may be received in and carried by the main body 40 in any desired manner, such as by being press-fit into the main body, screwed into the main body via threads in one or both bodies (e.g. mating or self-tapping threads), adhered, bonded, welded, clipped or otherwise secured in position within the inlet passage 20.

When the main body 40 is formed, pins may be received in a mold to form the inlet passage 20, intake passage 22 and outlet passage 24. To facilitate removal from the main body as or after the material of the main body cures, the pins may be tapered and may be wider at their bases than their free ends which would be received in or adjacent to the jet outlet area 28. The pins thus create passages that are smaller adjacent to the jet outlet area 28 than at their opposite ends (e.g. at the first inlet 12, second inlet 14 and outlet 16).

With respect to the inlet passage 20, the tapered, varying diameter of the inlet passage may help to ensure that the jet body 42 engages the main body 40 within the inlet passage even with part size variances due to tolerances in forming the main body and jet body. With respect to the outlet passage 24, the tapered, varying diameter may create a venturi shaped outlet passage having a mid-portion 48 with a smaller flow area than both the outlet 16 and the jet outlet area 28. Thus, the fluid flows from a larger jet outlet area 28 to a smaller portion 48 of the outlet passage 24 which becomes larger to the outlet end of the outlet passage 24. The converging and diverging flow areas change the flow rate and pressure of fluid flowing therethrough, and can improve the efficiency of the jet pump.

A modified jet pump body 50 is shown in FIG. 3. To facilitate explanation of this jet pump body 50, the same reference numerals will be used to refer to the same or similar parts as in jet pump body 10. In this implementation, the jet 52 is formed integrally with the remainder of the jet pump body 50, that is, in the same piece of material and at the same time the remainder of the jet pump body is formed. The pins used to form the second inlet 14, intake passage 22, outlet 16 and outlet passage 24 may be the same as or similar to those described above and the resulting passages may thus be formed in the same or similar manner. The pin used to form the inlet passage 20' may also include a smaller diameter tip which forms a jet outlet 54 having a desired diameter or flow area. The pin may also include a second tapered area that forms a reducing section 56 of the inlet passage 20' which has a larger flow area at an end closer to the first inlet 12 than the jet outlet 54. The reducing section 56 may more gradually transition fluid flow to the jet outlet 54 as compared to a right-angle step transition between the larger diameter inlet passage and smaller diameter jet outlet. As described above with respect to the jet outlet 26, the jet outlet 54 may be located radially between the inner surface 36 of the intake passage 22 and the axis 30 of the intake passage 22, but is generally located axially outboard of the intake passage 22 (relative to the intake passage axis 30). In this way, the pressure drop created by flow through the jet outlet 54 is directly communicated with the intake passage 22 to draw fluid through the intake passage 22.

A modified jet pump body 60 is shown in FIG. 4. To facilitate explanation of this jet pump body 60, the same reference numerals will be used to refer to the same or similar parts as in jet pump body 10. This jet pump may have a main body 40 that may be formed in the same manner as the main body 40 described with reference to FIG. 2, and may also include a jet body 42 as described with reference to FIG. 2. Additionally, this jet pump body 60 includes an outlet body 62 received in the outlet passage 24 and carried by the jet pump body 60.

The outlet body 62 is received within the outlet passage 24 between the jet outlet area 28 and the outlet 16. The outlet body 62 may be received in and carried by the main body 40 in any desired manner, such as by being press-fit into the main body, screwed into the main body via threads in one or both bodies (e.g. mating or self-tapping threads), adhered, bonded, welded, clipped or otherwise secured in position within the outlet passage 24. The outlet body 62 can be formed from the same type of material as the main body 40, or a different material, such as a metal like brass or stainless steel, as desired.

The outlet body 62 is tubular and has a flow passage 64 that is aligned with the outlet passage 24 and through which fluid flows prior to exiting the outlet 16. The flow passage 64 has a diameter or flow area that is smaller than the outlet 16, and smaller than the portion of the outlet passage 24 in which the outlet body 62 is received. Thus, the flow passage 64 helps to provide a venturi shape to the outlet passage 24 with a converging portion defined by the flow passage 64 and a diverging or larger flow area portion defined by the outlet passage 24 downstream of the outlet body 62. The flow passage 64 could have a constant diameter or flow area (cross-sectional area of the flow passage perpendicular to an axis of the flow passage) along an axial length of the flow passage or the flow area of the flow passage could vary along the axial length of the flow passage (e.g. to provide a further or enhanced venturi shape). This may permit control of the flow rate of fluid through the flow passage 64 as desired, to, for example, improve the efficiency of the jet pump.

FIGS. 5-8 illustrate a filter assembly 70 that includes a jet pump body 50 coupled to a filter 72. The filter 72 may include an interior 74 bounded by walls 76 defined by or including filter media of any desired shape, material and construction. Fluid enters the interior 74 by flowing through the filter wall(s) 76, and at least some contaminants are trapped or prevented from entering the interior by the walls 76. The fluid in the filter interior 74 is communicated with the jet pump body 50 via a filter outlet passage 78 through which fluid flows to the jet pump body 50.

Any of the jet pump bodies 10, 50, 60 previously described, or a jet pump body of a different construction, may be coupled to the filter 72. In the implementation shown, the jet pump body 50 shown in FIG. 3 is connected to the filter 72 via a coupler 80. The coupler 80 includes a tubular body 82 sealed about its periphery to one or more walls 76 of the filter 72, such as by having a radially outwardly extending flange 84 at a base of the tubular body 82 glued, welded or otherwise bonded to a surface of a filter wall 76. The tubular body 82 is received in or over the portion of the jet pump body 50 that defines the intake passage 22.

The jet pump body 50 may be secured to the coupler 80 in any desired manner, such as by being press-fit into or over the tubular body 82, screwed into the tubular body 82 via threads in one or both bodies (e.g. mating or self-tapping threads), adhered, bonded, welded, clipped or otherwise secured in position relative to the coupler. Further, the coupler 80 and jet pump body 50 may include cooperating orientation features so that the jet pump body 50 can be oriented and retained in different angular orientations relative to the coupler 80. In at least some implementations, such as is shown in FIG. 7, the orientation features include one or more projections 86 carried by one of the coupler and jet pump, and one or more voids 88 carried by the other of the coupler and jet pump.

In the implementation shown, the coupler 80 includes a plurality of voids 88 circumferentially spaced about the periphery of the coupler, outboard of the filter outlet 78 and tubular body 82. The voids 88 are open in the direction of connection of the jet pump body 50 to the coupler 80, in this example, this is parallel to an axis 90 (FIG. 6) of the coupler 80. The voids 88 are provided in a radially outwardly extending portion 92 of the coupler 80, and are axially between the filter 73 and a free end 94 (FIG. 6) of the tubular body 82. The outwardly extending portion 92 may be formed in the same piece of material as the tubular body 82 or the outwardly extending portion may be formed separately from and then connected to the tubular body.

The jet pump body 50 includes a projection, referred to hereafter as a post 86 (labeled in FIGS. 7 and 8), that is adapted to be received in one of the voids 88 of the coupler 80. The post 86 extends outwardly from the jet pump body 50, and is spaced from the portion of the jet pump body 50 that defines the intake passage 22 so that the post 86 is located outboard of the tubular body 82 when the jet pump body 50 is installed on the coupler 80. The post 86 extends axially (e.g. parallel to the axis 90 of the tubular body when the jet pump body 50 is installed on the coupler) and when received in a void 88, prevents rotation of the jet pump body 50 relative to the coupler 80 about the axis 90.

To change the orientation of the jet pump body 50 relative to the coupler 80 and filter 72, the jet pump body 50 is moved axially away from the coupler 80 to remove the post 86 from a void 88, the jet pump body 50 is rotated relative to the coupler 80, and the jet pump body 50 is moved axially back into position relative to the tubular body 82 until the post 86 is received within a different one of the voids 88. Any number of voids 88 may be provided to provide any desired number of orientations of the jet pump body 50 relative to the coupler 80, and the post 86 and voids 88 could be arranged for receipt of the post 86 into a void 88 in a different manner upon installation of the jet pump body to the coupler. Further, the jet pump body could include one or more voids and the coupler could include one or more posts to permit different angular orientations of these components. While a jet pump body might remain in one position for the service life of a given system, the orientation features facilitate use of the assembly 70 in different applications wherein, for example, hoses and other components may require different orientations of the jet pump body.

In operation of the jet pump, fluid is drawn from the filter interior 74, through the filter outlet 78, and into and through the tubular body 82 and intake passage 22 in the manner described above. The driving fluid may be provided from a fluid pump, which may have a pumping element driven by an electric motor to increase fluid pressure and discharge fluid under pressure from an outlet. The driving fluid may include a portion of the fluid discharged from the fluid pump outlet that is directly routed to the jet pump inlet 12, or fluid from another source, such as fluid that is discharged/bypassed from a pressure regulator (where the regulator may receive fluid discharged from the fluid pump outlet and allows fluid at a given pressure to pass through the regulator main outlet and bypasses some fluid through a regulator secondary outlet, in a known manner). Examples of jet pump uses in which the jet pump as constructed herein may be substituted include PCT Publication WO2020/106430, and U.S. Publication No. 20200355148 and U.S. Pat. No. 11,008,987, which are incorporated herein by reference.

As noted above, the jet pump 10, 50, 60 and filter assembly 70 is useful to pump fluid from one area to another. For example, as diagrammatically illustrated in FIG. 7, the filter 72 could be located outside of a reservoir 96 in which an electric motor driven fuel pump 98 is received, and fuel could be routed or discharged directly from the jet pump outlet 16 into the interior 100 of the reservoir 96. The jet pump could also be outside of the reservoir 96, or the coupler 80 (e.g. its tubular body 82) could extend through an opening 102 in the reservoir 96 so that the filter 72 is outside the reservoir 96 and the jet pump body 50 is within the reservoir interior 100 (as shown in FIG. 7). In this way, fuel within a fuel tank can be pumped into the reservoir 96 to maintain a supply of fuel in the reservoir interior 100 that is available to be pumped by the electric motor driven fuel pump 98. While these examples relate to pumping liquid fuel, other liquids can be pumped by the jet pumps described herein, and via the filter assemblies described herein.

From the exterior, the inlet end and outlet end of the jet pump body 50 may appear similar, in at least some implementations. To facilitate assembly of the jet pump body 50 to tubes or bodies that provide driving fluid to the inlet 12 and any tubes or bodies to which fluid from the outlet 16 is provided, the jet pump body may include one or more markings or indicia that indicate the orientation of the jet pump body 50. In the example shown in FIG. 7, an arrow 106 is provided on the jet pump body 50 on a surface opposite to the portion that defines the intake passage 22. As shown in FIG. 7, when the jet pump body 50 is coupled to the filter 72, with the intake passage portion connected to the coupler 80, the arrow 106 is oriented for easy viewing by assembly personnel. The arrow 106, in this example, indicates the direction of fluid flow and the head of the arrow points to the outlet 16 of the jet pump body 50. The arrow 106 is formed when the jet pump body 50 is molded, or may be added after forming the jet pump body, as desired. Of course, other indicia could be used, as desired.

FIGS. 9-11 illustrate different implementations of a pressure regulator 110 that includes a secondary pump 112. As shown in FIG. 9, the pressure regulator includes a housing 114 having an inlet 116 and inlet passage 117 through which fuel enters a regulating chamber 118 defined at least in part by a first body 120 of the housing 114 and a diaphragm 122 which defines a dry chamber 124 on the side of the diaphragm opposite to the regulating chamber. The diaphragm 122 may have its perimeter trapped between the first body

120 and a second body 125 of the housing 114 that is coupled to the first body 120. A spring 126 or other biasing member may be received in the dry chamber 124 to oppose the force of the fuel acting on the diaphragm 122 from within the regulating chamber 118. The diaphragm 122, or a valve head 128 coupled to the diaphragm 122, may engage a valve seat 130 that leads to an outlet passage 131 and outlet 132 of the regulator 110 to close the outlet 132. When acted upon by sufficient fuel pressure, the diaphragm 122 may be displaced against the spring force and thereby open the valve seat 130 and permit fuel flow through the valve seat.

Fuel that flows through the valve seat 130 is routed to the secondary pump 112, such as to a secondary pump inlet 134. In at least some implementations, such as that shown in FIG. 9, the secondary pump 112 includes a nozzle 136, jet or restriction that is downstream of the secondary pump inlet 134 and which increases the velocity of fuel flowing therethrough. The nozzle 136 discharges fuel into a larger chamber or area 138, which may be defined by part of a venturi 140 or tapered portion of the outlet passage 131 of the first body 120 that leads to the regulator outlet 132. The increase in velocity of fuel discharged from the nozzle 136 causes a decrease in pressure in the area 138 downstream of the nozzle 136 which is communicated with an intake passage 146. The pressure drop causes fuel to flow through the intake passage 146 whereupon that fuel joins the fuel discharged from the nozzle 136 and the combined fuel flow may be discharged into the outlet passage 131 and from the regulator outlet 132. While the inlet 116, inlet passage 117, valve seat 130, secondary pump inlet 134, jet pump nozzle 136, outlet passage 131, intake passage 146 and outlet 132 are shown as being integrally formed in the same piece of material (e.g. the material defining the first body 120), the nozzle and/or outlet and/or intake passage may be formed in separate pieces of material and coupled to the first body, to define part of the first body 120 after assembly, as desired.

The fuel discharged from the regulator outlet 132 may be directed to any desired area of a fuel tank or to any desired component, such as to a reservoir from which a primary fuel pump takes in fuel to pump fuel to the engine. If desired, a filter 72 (such as described previously) may be provided at the intake passage 146, or at the outlet 132, to help remove contaminants from the fuel.

In a fuel system, a primary fuel pump 98 (which may be like that previously described herein) may be used to pump fuel to an engine under pressure. The fuel demand of the engine varies and is much less when the engine is idling than when the engine is operated at wide open throttle or a maximum speed and/or load. The fuel pressure regulator 110 may bypass fuel from the flow of fuel to the engine so that only the fuel needed by the engine is delivered to the engine, or so that not too much in excess of the engine fuel demand is delivered to the engine, with the excess returned to a fuel tank via fuel return conduit, as is known. Thus, the regulator inlet 116 may be communicated with the output of the primary fuel pump 98 and when more fuel is pumped by the primary fuel pump than is needed by the engine, the regulator valve may open (e.g. the diaphragm 122 may be displaced from the valve seat 130) and fuel may flow to the secondary fuel pump 112 and then to the regulator outlet 132. Use of the bypassed fuel flow to drive the secondary fuel pump 112 which draws in further fuel from the fuel tank, is an efficient way to pump fuel with the secondary fuel pump 112 that does not consume fuel intended for or that might otherwise be directed to the engine.

In FIG. 9, the inlet 116 and outlet 132 (e.g. passages 117, 131 leading to the inlet and outlet) are oriented in different directions with respect to the regulating chamber 118, and are shown as being oriented in generally parallel and opposed directions (e.g. at an angle of 180 degrees to each other). That is, the inlet 116 leads into the regulating chamber 118 from a first side of the regulating chamber and the outlet 132 leads from the regulating chamber 118 from an opposite second side of the regulating chamber. In FIG. 10, the first body 150 (shown without the second body of the housing, and the diaphragm and spring) includes an inlet 152 and inlet passage 153, and an outlet 154 and outlet passage 155 that are oriented in the same direction relative to the regulating chamber 118. That is, the inlet passage 153 leads into the regulating chamber 118 from a first side of the regulating chamber and the outlet passage 155 leads from the regulating chamber from the same first side of the regulating chamber. The inlet passage 153 and outlet passage 155 may be oriented in any desired directions or angles on the first body 150 and with respect to the regulating chamber 118, as desired. A regulator including the first body 150 may otherwise be formed the same as set forth with regard to FIG. 9. In FIG. 10 similar reference numbers are used to denote features or components that are the same or similar as those in FIG. 9.

To aid in forming a nozzle 136 for the secondary fuel pump 112, the first body 150 may include an access opening or access passage 158 coaxial with the outlet passage 154 and nozzle 136, and extending through an opposite side of the first body 150. A pin or drill bit may be inserted into the access passage to form the nozzle 136 as the first body 150 is formed or after the first body is otherwise formed. The pin or drill bit is removed from the access passage 158 after the nozzle 136 is formed and then the access passage 158 may be closed (e.g. capped off by a plug 159 or otherwise closed) so that fuel does not flow out of the first body through the access passage in use of the first body 150.

FIG. 11 shows a first body 160 of a fuel pressure regulator that is constructed and arranged the same as that shown in FIG. 10 with the exception that a regulating passage 162 is provided in the first body 160. The regulating passage 162 may be provided where the access passage 158 was provided in the implementation shown in FIG. 10, or elsewhere as desired. A pressure regulating valve 166 may be provided in the regulating passage 162 to limit the pressure downstream of the valve seat 130 and at the inlet 134 to the secondary pump 112. In at least some implementations, the regulating valve 166 includes a valve element 168 having a valve head 170 urged against a valve seat 172 by a spring 174. The valve seat 172 may be defined by a surface of the first body 160 adjacent to the regulating passage 162, or the regulating valve 166 may include a housing that defines the valve seat, with the housing received at least partially within the regulating passage 162. When fuel below a threshold pressure is present at the inlet 134 of the secondary pump 112, the valve head 170 remains engaged with the valve seat 172 and fuel does not flow through the regulating valve 166 (or fuel flow therethrough is limited). When fuel above a threshold pressure is present at the inlet 134 of the secondary pump 112, the valve head 170 is displaced from the valve seat 172 and fuel may flow through the regulating valve 166 (or a greater flow rate of fuel may flow through the regulating valve than when the valve head is engaged with the valve seat). Thus, the pressure of fuel at the secondary pump inlet 134 and available to the nozzle 136 is limited to the threshold pressure which may be set as desired for different applications. In this implementation, fuel flow through the valve seat 130 of the pressure regulator 110 is controlled by the main pressure regulator valve via the diaphragm 122, and the pressure of fuel that flows through the secondary fuel pump 112 is controlled by the regulating valve 166.

In at least some implementations, this enables use of a nozzle 136 having a smaller flow area and more pressure will be available in situations in which lower flow rates of fuel flow through the pressure regulator 110, such as when the engine is consuming more fuel. In general, more fuel flows through the valve seat 130 and to the nozzle 136 when the engine is at idle than when the engine is at wide open throttle or other higher engine fuel consumption operating modes. Further, the regulating valve 166 prevents too high of a pressure from being present downstream of the main valve seat 130 by opening to allow fuel flow through the regulating passage 162. Thus, any effect that the fuel pressure downstream of the valve seat 130 might have on the operation of the main pressure regulator 110, such as when the engine is idling and more fuel is bypassed through the pressure regulator 110, can be mitigated.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

As used in this specification and claims, the terms "for example," "for instance," "e.g.," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A fuel pressure regulator, comprising:
a housing having:
a first body defining: an inlet, a portion of a pressure regulating chamber in communication with the inlet, a jet pump inlet in communication with the pressure regulating chamber, a nozzle in fluid communication with the jet pump inlet, a discharge chamber in fluid communication with the nozzle, an intake passage in fluid communication with the discharge chamber for ingress of fuel from the fuel tank, and an outlet in fluid communication with the discharge chamber; and,
a second body coupled to the first body defining a dry chamber and a second portion of the regulating chamber;
a diaphragm carried by the housing and defining part of the pressure regulating chamber, the diaphragm having a first position closing the valve seat and a second position in which fuel flows through the valve seat, a spring in the dry chamber for biasing the diaphragm into the first position; and
a secondary fuel pump carried by the housing, the secondary fuel pump having a nozzle and an intake passage communicated with an area downstream of the nozzle and with the outlet, wherein the nozzle is aligned with the outlet and fuel that flows through the valve seat then flows through the nozzle prior to exiting the housing through the outlet, and wherein fuel flow through the nozzle creates a drop in pressure to draw fuel into the housing through the intake passage.

2. The fuel regulator of claim 1 wherein the nozzle is formed in a same piece of material as the first body.

3. The fuel regulator of claim 1 wherein the intake passage is formed in a same piece of material as the first body.

4. The fuel regulator of claim 1 wherein the nozzle, valve seat, inlet and outlet are provided in the first body.

5. The fuel regulator of claim 1 which also includes a regulating valve having an inlet communicated with the valve seat and with the nozzle, the regulating valve including a valve element that opens when the pressure of fuel downstream of the valve seat and upstream of the nozzle is greater than a threshold pressure.

6. The fuel regulator of claim 1 wherein the inlet and the outlet are defined in passages that extend from a same side of first body.

7. A fuel pressure regulator, comprising:

a housing that is distinct from a fuel tank, having a first body with a valve seat, the housing having a second body coupled to the first body, the housing having an inlet, a pressure regulating chamber in communication with the inlet, and the housing has an outlet;

a diaphragm carried by the housing and defining part of the pressure regulating chamber, the diaphragm having a first position closing the valve seat and a second position in which fuel flows through the valve seat; and a secondary fuel pump carried by the housing, the secondary fuel pump having nozzle and an intake passage communicated with an area downstream of the nozzle and with the outlet, wherein the nozzle is aligned with the outlet and fuel that flows through the valve seat then flows through the nozzle prior to exiting the housing through the outlet, wherein fuel flow through the nozzle creates a drop in pressure to draw fuel into the housing through the intake passage.

8. The fuel regulator of claim 7 wherein the nozzle is formed in the same piece of material as the first body.

9. The fuel regulator of claim 7 wherein the intake passage is formed in the same piece of material as the first body.

10. The fuel regulator of claim 7 wherein the nozzle, valve seat, inlet and outlet are provided in the first body.

11. The fuel regulator of claim 7 which also includes a regulating valve having an inlet communicated with the valve seat and with the nozzle, the regulating valve including a valve element that opens when the pressure of fuel downstream of the valve seat and upstream of the nozzle is greater than a threshold pressure.

12. The fuel regulator of claim 7 wherein the inlet and the outlet are defined in passages that extend from the same side of first body.

13. A pressure regulator for pumping fuel in a fuel tank, the pressure regulator comprising:

a first body defining: an inlet; a first portion of a regulating chamber in fluid communication with the inlet; a jet pump inlet in fluid communication with the regulating chamber; a valve seat between the regulating chamber and the jet pump inlet; a nozzle in fluid communication with the jet pump inlet; a discharge chamber in fluid communication with the nozzle; an intake passage in fluid communication with the discharge chamber for ingress of fluid from the fuel tank; and an outlet in fluid communication with the discharge chamber;

a second body defining: a dry chamber; and a second portion of the regulating chamber;

a diaphragm coupled between the first and second body to move between a normally closed position against the valve seat to prevent fuel from flowing through the valve seat and an open position spaced from the valve seat to allow fuel to flow through the valve seat; and a spring in the dry chamber for biasing the diaphragm into the normally closed position, wherein when the diaphragm is moved from the normally closed position to the open position by sufficient fuel pressure in the regulating chamber, fuel passes through the valve seat to the jet pump inlet so that the nozzle increases a velocity of the fuel that discharges into the discharge chamber, thereby creating a negative pressure in the discharge chamber to draw additional fuel from the fuel tank into the intake passage to join the fuel flowing through the nozzle and, thereby, functioning as a jet pump.

14. The pressure regulator of claim 13, wherein: the discharge chamber is relatively larger than the jet pump inlet; the diaphragm carries a valve head for sealingly contacting the valve seat; and the outlet includes a venturi.

15. The pressure regulator of claim 13, further comprising a filter attached to the intake passage.

16. The pressure regulator of claim 13, wherein the inlet and the outlet open in a same direction.

17. The pressure regulator of claim 13, wherein the first body forms a regulating passage in fluid communication with the jet pump inlet and further comprising a second pressure regulating valve in the regulating passage for selectively allowing fuel flow through the regulating passage when a threshold is exceeded to prevent too high of a pressure being present downstream of the valve seat.

* * * * *